United States Patent [19]
Chen

[11] Patent Number: 5,088,671
[45] Date of Patent: Feb. 18, 1992

[54] RETAINING DEVICE FOR A SENSOR OF A REVOLUTION COUNTER OF A CYCLING VEHICLE

[76] Inventor: Hsi L. Chen, No. 171, Wu Chuan Wu St., Taichung, Taiwan

[21] Appl. No.: 710,376

[22] Filed: Jun. 3, 1991

[51] Int. Cl.⁵ .............................................. E04G 3/00
[52] U.S. Cl. .................... 248/229; 248/224.3; 248/904; 272/DIG. 5
[58] Field of Search .............. 248/229, 231, 231.1, 248/904, 205.1, 224.3, 316.1, 222.3; 272/73, DIG. 5, DIG. 6

[56] References Cited

U.S. PATENT DOCUMENTS 2,267,583 12/1941 Carroll .......................... 248/904 X
2,506,924  5/1950 Huber ............................ 248/904 X
5,020,706  6/1991 Birch .

Primary Examiner—Ramon O. Ramirez
Attorney, Agent, or Firm—Kolisch, Hartwell, Dickinson, McCormack & Heuser

[57] ABSTRACT

A retaining device for coupling a sensor to a frame fork of a cycling vehicle including a sleeve formed integral with the sensor, a pair of oblong holes formed in the sleeve, a clamp ring engageable on the frame fork and including a rod radially extended outward from one end and a lug formed in the other end thereof, and a bolt extended through the oblong holes of the sleeve and the rod and the lug of the clamp ring, and the sleeve being rotatable relative to the rod before the bolt is fixed in place so that an angular position of the sleeve can be adjusted.

2 Claims, 4 Drawing Sheets

RETAINING DEVICE FOR A SENSOR OF A REVOLUTION COUNTER OF A CYCLING VEHICLE

BACKGROUND OF THE INVENTION

1. Field of the Invention

The present invention relates to a retaining device, and more particularly to a retaining device for a sensor of a revolution counter of a cycling vehicle.

2. Description of the Prior Art

Typical revolution counter which is commercially available in Taiwan, Republic of China is shown in FIGS. 5 and 6 and comprises a magnet 42 fixed on a spoke 41 of a wheel 40 of a cycling vehicle, such as a cycling exerciser, and a sensor 60 integrally fixed to a clamp ring 30 which is coupled to a frame fork 30 of the cycling vehicle by a bolt 63. The distance between the magnet 42 and the wheel axle 44 is equal to the distance between the sensor 60 and the wheel axle 44 so that the sensor 60 can count the revolutions of the wheel 40 by the relative movement between the magnet 42 and the sensor 60. However, the spokes 41 of the wheel 40 are slightly inclined relative to the frame fork 30, and the angular position of the sensor 60 can not be adjusted so that the magnet 42 and the sensor 60 can not be disposed in parallel precisely and so that a measurement error may be generated.

The present invention has arisen to mitigate and/or obviate the afore-described disadvantages of the conventional retaining devices for sensors.

SUMMARY OF THE INVENTION

The primary objective of the present invention is to provide a retaining device for a sensor of a revolution counter in which the sensor can be disposed precisely in parallel to the magnet so that the revolution counter may have more precise measurements.

In accordance with one aspect of the invention, there is provided a retaining device for coupling a sensor to a frame fork of a cycling vehicle, the retaining device including a sleeve formed integral with the sensor, a pair of oblong holes formed in the sleeve, a clamp ring engageable on the frame fork and including a rod radially extended outward from one end and a lug formed in the other end thereof, an aperture formed in the rod, a hole formed in the lug, and a bolt extended through the oblong holes of the sleeve and the aperture and the hole of the clamp ring, and the sleeve being rotatable relative to the rod before the bolt is fixed in place so that an angular position of the sleeve can be adjusted.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
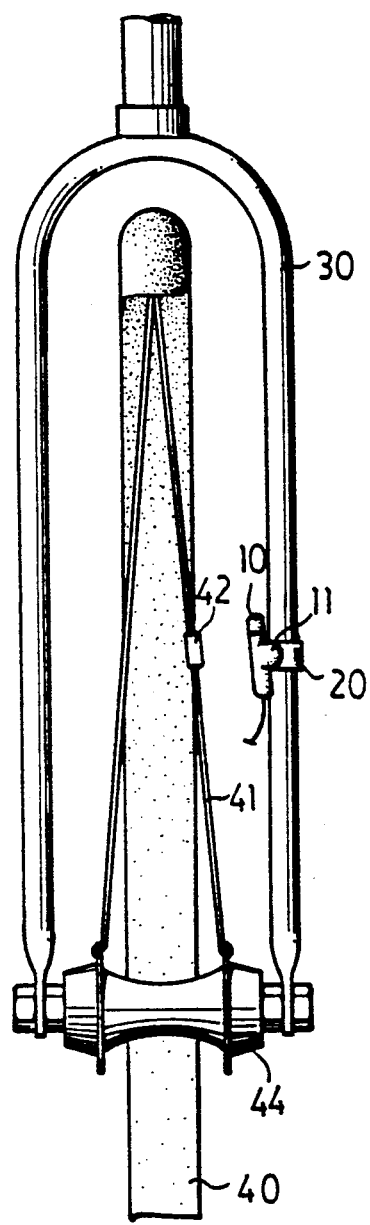
FIG. 1 is a plan view of a revolution counter which is disposed on a cycling vehicle.
Figure 2:
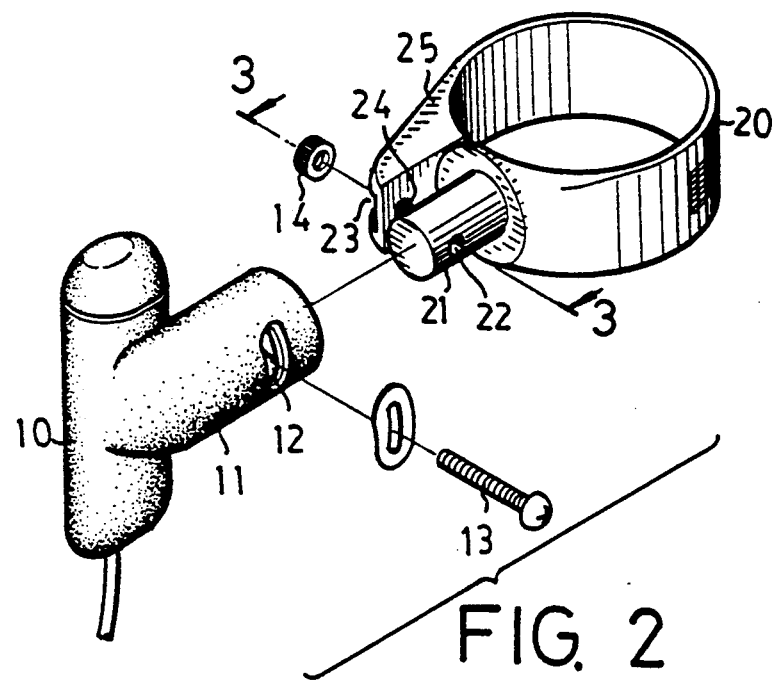
FIG. 2 is an exploded view of a retaining device in accordance with the present invention.

Referring to the drawings and initially to FIGS. 1 and 2, a retaining device 20 in accordance with the present invention is provided for coupling a sensor 10 of a revolution counter to a frame fork 30 of a cycling vehicle, such as a cycling exerciser. The cycling vehicle also comprises a magnet 42 fixed on a spoke 41 of a wheel 40 which has a wheel axle 44. The distance between the magnet 42 and the wheel axle 44 is equal to the distance between the sensor 10 and the wheel axle 44 so that the sensor 10 can count the revolutions of the wheel 40 by relative movement between the magnet 42 and the sensor 10. The sensor 10 and the magnet 42 are not related to the present invention and will not be described in further details.

Figures 3, 4:
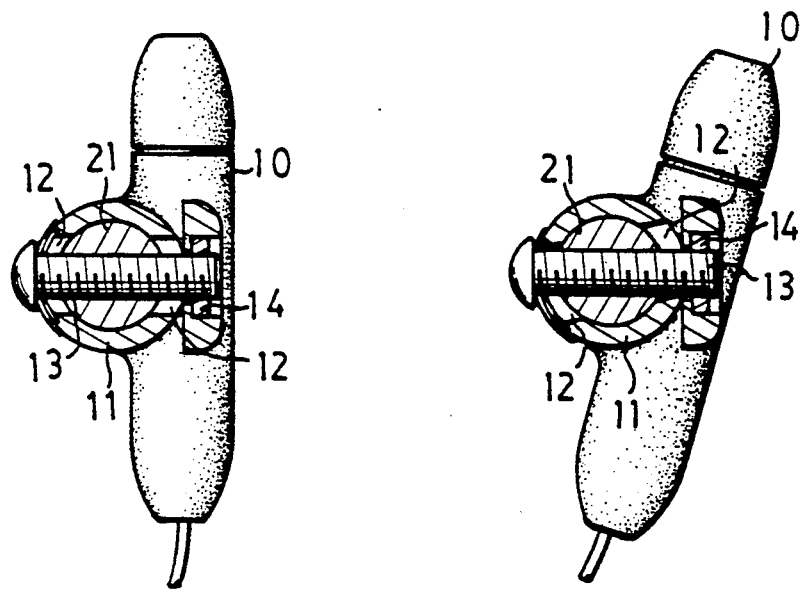
FIGS. 3 and 4 are cross sectional views taken along lines 3—3 of FIG. 2.
Figure 5:
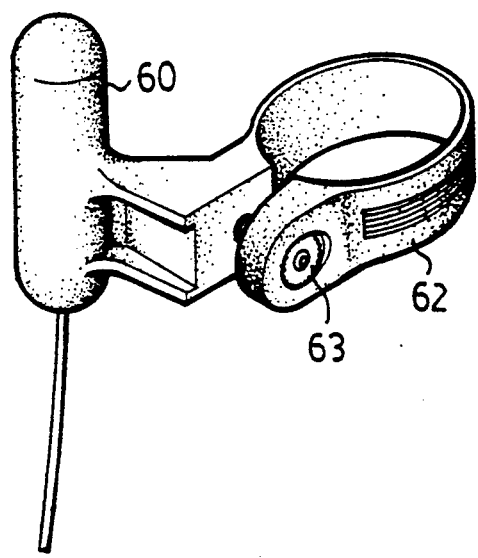
FIG. 5 is a perspective view of a conventional retaining device for coupling a sensor to a frame fork of a cycling vehicle.
Figure 6:
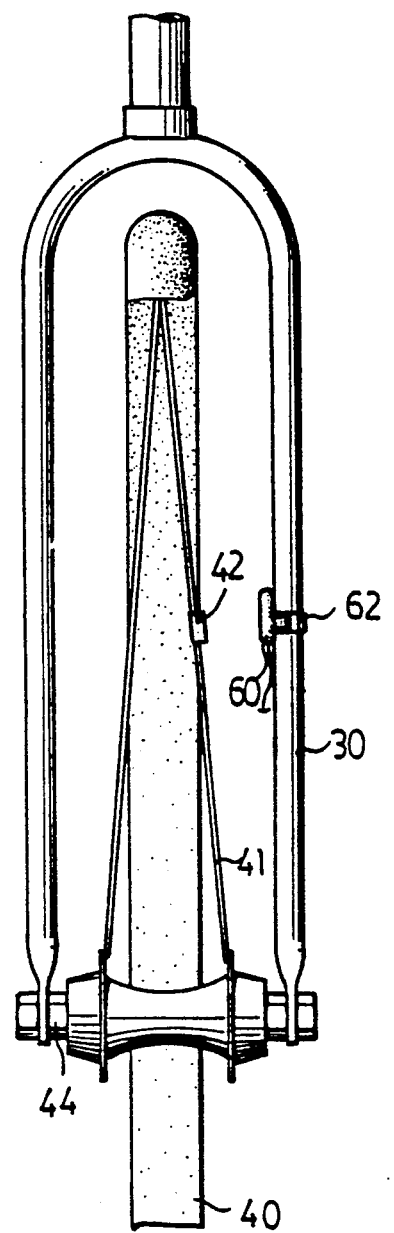
FIG. 6 is a plane view of the cycling vehicle to which the retaining device as shown in FIG. 5 is fixed.

A sleeve 11 is formed integral with the sensor 10 and is substantially perpendicular to the sensor 10. A pair of oblong holes 12 are oppositely formed in the sleeve 11 (FIGS. 3 and 4). The retaining device 20 comprises generally a clamp ring having a rod 21 extended radially outward from a first end thereof and having a lug 25 formed in a second end thereof. The rod 21 is engageable in the sleeve 11 and has an aperture 22 formed therein. The lug 25 has a recess 23 and a hole 24 formed therein. A bolt 13 extends through the oblong holes 12 of the sleeve 11 and through the aperture 22 and the hole 24 of the clamp ring 20 and is engaged with a nut 14 so that the sleeve 11 and the clamp ring 20 can be fixed together.

Referring next to FIGS. 3 and 4, the sleeve 11 is rotatable relative to the rod 21 by engagement between the bolt 13 and the oblong holes 12 before the bolt 13 is fixed in place so that the angular position of the sleeve 11 relative to the rod 21 can be adjusted and so that the sensor 10 can be disposed precisely in parallel to the magnet 42.

Accordingly, the sensor 10 can be precisely disposed in parallel to the magnet 42 by the retaining device in accordance with the present invention so that the revolution counter of the cycling vehicle may have more precise measurements.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A retaining device for coupling a sensor of a revolution counter to a frame fork of a cycling vehicle comprising a sleeve formed integral with said sensor, said sleeve including a pair of oblong holes oppositely formed therein, a clamp ring engageable on said frame fork and including a first end and a second end, a rod radially extended outward from said first end of said clamp ring and having an aperture formed therein, a lug formed in said second end of said clamp ring and having a hole formed therein, and a bolt extended through said oblong holes of said sleeve and said aperture and said hole of said clamp ring, and said sleeve being rotatable relative to said rod before said bolt is fixed in place so that an angular position of said sleeve can be adjusted.

2. A retaining device according to claim 1, wherein said lug has a recess formed therein for receiving a nut which is engageable with said bolt so as to fix said bolt in place.

* * * * *